United States Patent
Sun et al.

(10) Patent No.: US 7,112,757 B2
(45) Date of Patent: Sep. 26, 2006

(54) PROGRAMMABLE RESISTANCE SEAM WELDING APPARATUS AND METHOD

(75) Inventors: Peter C. Sun, Rochester Hills, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/924,639

(22) Filed: Aug. 24, 2004

(65) Prior Publication Data

US 2006/0043074 A1    Mar. 2, 2006

(51) Int. Cl.
*B23K 11/06* (2006.01)

(52) U.S. Cl. .......................... 219/83; 219/82; 219/120

(58) Field of Classification Search ................. 219/81, 219/82, 83, 84, 86.25, 119, 120
See application file for complete search history.

(56) References Cited

U.S. PATENT DOCUMENTS

| | | | | |
|---|---|---|---|---|
| 1,052,490 A * | 2/1913 | Linden et al. | ................. | 219/82 |
| 2,179,693 A * | 11/1939 | Goldstein | ................... | 219/120 |
| 2,346,088 A * | 4/1944 | Shobert | ...................... | 219/119 |
| 2,472,173 A * | 6/1949 | Powell | ...................... | 219/119 |
| 2,523,367 A * | 9/1950 | Holt | ............................ | 219/120 |
| 2,655,583 A * | 10/1953 | Souter | ........................ | 219/119 |
| 3,011,044 A * | 11/1961 | Spooner | ...................... | 219/82 |
| 6,429,397 B1 * | 8/2002 | Sun et al. | ................. | 219/86.25 |

* cited by examiner

*Primary Examiner*—Clifford C. Shaw
(74) *Attorney, Agent, or Firm*—Kathryn A. Marra

(57) ABSTRACT

A resistance welding apparatus having a pair of programmable ball electrodes carried on universally movable positioners. The positioners are programmed to move the ball electrodes simultaneously along a seam line so that the ball electrodes clamp and support opposite sides of a pair of stacked workpieces and are electrically charged to form resistance seam welds along the seam lines to connect the workpieces.

16 Claims, 2 Drawing Sheets

PROGRAMMABLE RESISTANCE SEAM WELDING APPARATUS AND METHOD

TECHNICAL FIELD

This invention relates to resistance seam welding and, more particularly, to a resistance seam welding apparatus and method.

BACKGROUND OF THE INVENTION

Resistance seam welding is known in the art for joining metal workpieces. The workpieces may be stacked or otherwise held in temporary assembly. The workpieces are then clamped between a pair of roller electrodes, which locally compress the workpieces. The electrodes are energized, causing electrical current flow through the workpieces to locally heat the workpieces between the electrodes and thereby form a weld. During this time the workpieces and the rollers are moved relative to one another to elongate the weld and thereby form a seam weld between the workpieces.

Roller electrodes commonly have a larger contact area than conventional electrodes, which distributes welding current over a larger workpiece area. Thus a greater flow of electric current is required than with conventional electrodes to heat the larger area and form a weld. The larger contact area of a roller electrode also creates welding limitations when the workpieces to be joined are contoured or non-planar. In addition, roller wheels must be turned as they are moved relative to the workpieces to create a curved or angled seam weld.

Thus, it is desirable to provide a resistance seam welding electrode which provides a smaller contact area than conventional rollers to reduce electric current requirements. It is also desirable to provide an apparatus for resistance seam welding having electrodes adapted for universal directional motion to conform to any desired weld pattern or part shape.

SUMMARY OF THE INVENTION

The present invention provides a resistance seam welding apparatus having a pair of universally programmable movable positioners each preferably carrying a ball electrode. The positioners are programmed to move the ball electrodes simultaneously along a seam line so that the electrodes clamp on opposite sides of a pair of workpieces as current is passed through the workpieces, between the electrodes, to form a resistance seam weld.

In an exemplary embodiment, the resistance seam welding apparatus may include a suitable holding fixture or support adapted to carry a structural assembly formed of stacked workpieces.

The resistance seam welding apparatus may further include a first programmable positioner in the form of a programmable robot. The positioner includes an end effector or holder carrying a coupler shank with a part-spherical socket for carrying a ball electrode therein. A retainer ring is attached to the shank, to retain the ball electrode in the socket. If desired, a cooling passage may extend within the jointed arm and into the coupler shank to provide liquid coolant flow to remove heat from the coupler shank and the ball electrode.

The resistance seam welding apparatus may also include a second programmable positioner located beneath the support. The second positioner includes a holder mounting a coupler shank with a part-spherical socket carrying a ball electrode therein. A retainer ring is attached to the end of the shank to retain the ball electrode within the socket. If desired, a cooling passage may extend within the lower coupler shank to provide liquid coolant flow to remove heat from the coupler shank and the electrode.

An electric current source, such as a transformer is attached to the base of the robot and supplies welding current to the upper and lower electrodes through the positioners.

The first and second positioners of the invention may be used with workpieces having differing configurations, which may be accommodated by merely programming the positioners. The ball electrodes provide smaller welding contact points than do conventional roller wheels. These reduce the amount of contacting surface area between the electrodes and the surfaces of the workpieces, which reduces the amount of welding current required to form a weld. The ball electrodes allow the positioners to move the ball electrodes over curves and bends in the workpieces without loosing contact. The ball electrodes also allow the positioners to freely move the electrodes in any direction without having to steer the electrodes.

These and other features and advantages of the invention will be more fully understood from the following description of certain specific embodiments of the invention taken together with the accompanying drawings.

DESCRIPTION OF THE PREFERRED EMBODIMENT

Figure 1:
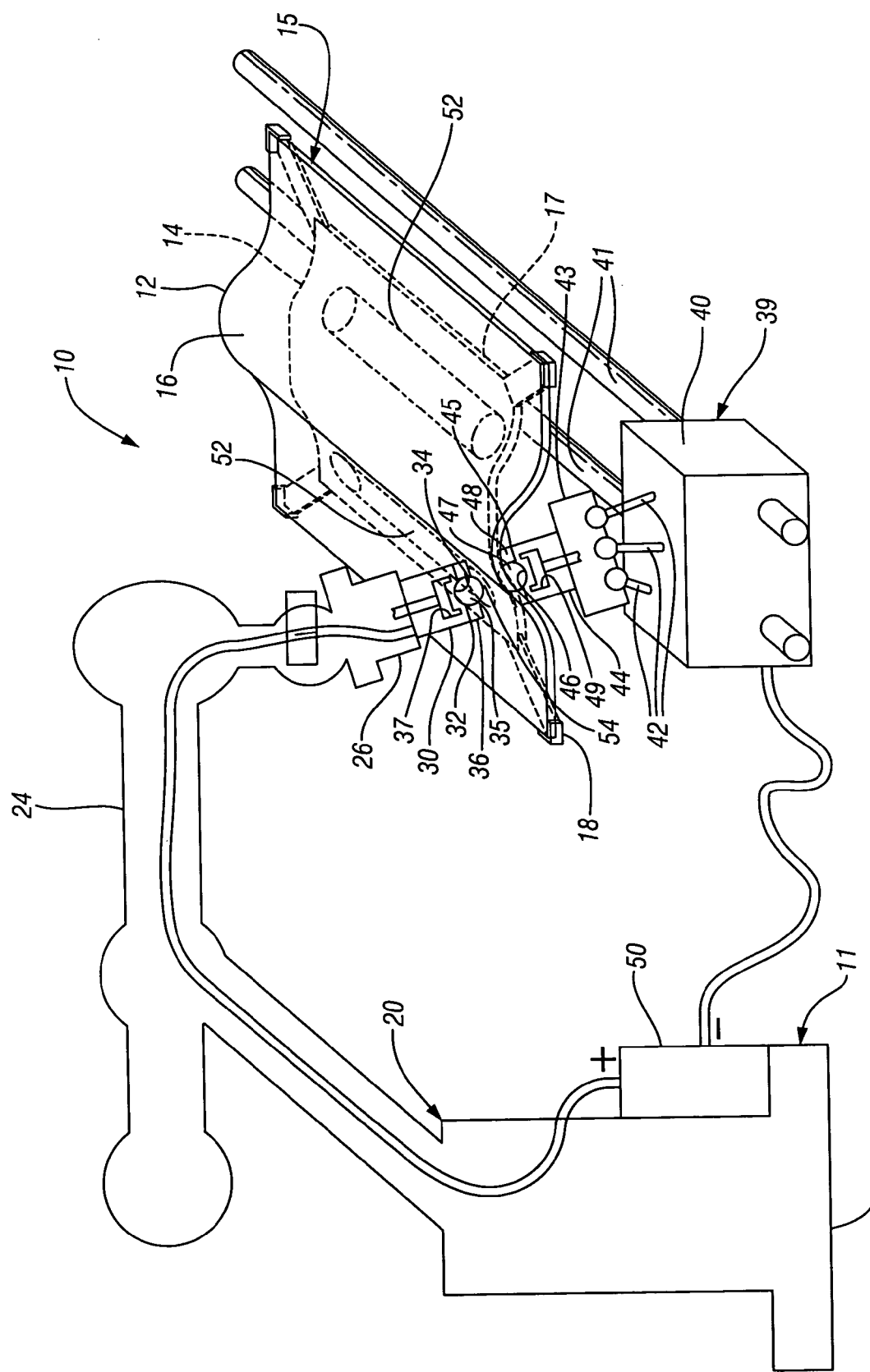
FIG. 1 is a schematic pictorial view of a resistance seam welding apparatus according to the invention.

Referring first to FIG. 1 of the drawings, numeral 10 generally indicates a workstation containing an apparatus 11 configured for resistance seam welding of workpieces. A temporary assembly of workpieces, such as a tunneled floor pan 12 and a tunnel undershield 14 are supported in the apparatus for welding into a structural assembly 15 in the form of a floor pan assembly for a vehicle. The structural assembly 15 includes an upper side 16 of the floor pan 12 and a lower side 17 of the undershield 14.

The resistance seam welding apparatus 11 includes a suitable holding fixture or support 18 adapted to carry the temporary assembly of the structural floor pan 12 and undershield prior to and during welding of these workpieces into the structural assembly 15.

The resistance seam welding apparatus 11 further includes a first positioner in the form of a robot 20. If appropriate, any other suitable form of programmable positioner may be substituted for the robot 20 within the scope of the invention.

Figure 2:
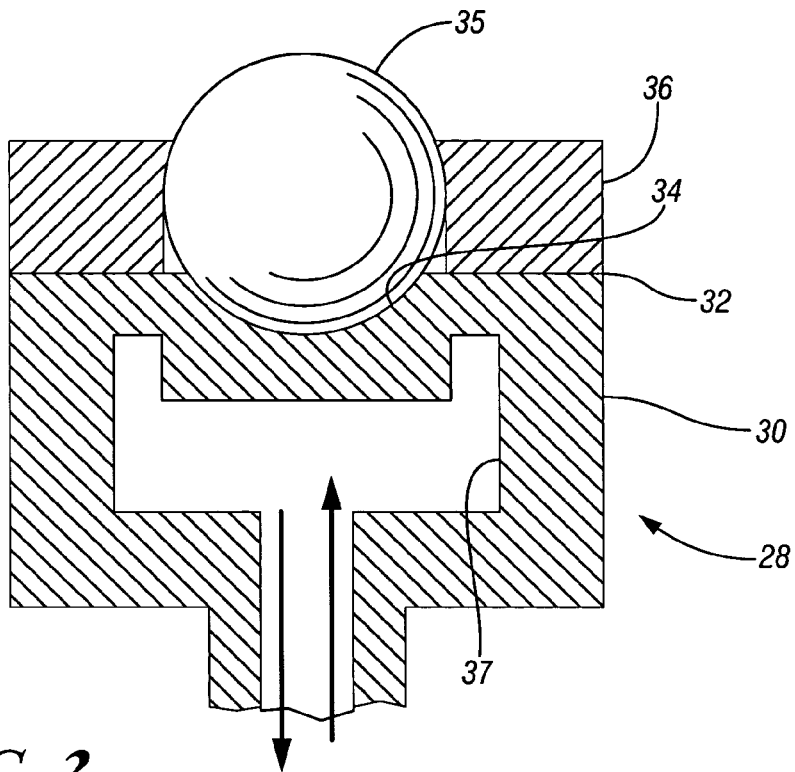
FIG. 2 is a schematic cross-sectional view through a ball electrode assembly for the resistance seam welding apparatus of FIG. 1.

The robot 20 includes a base 22 supporting a jointed arm 24 with an end effector or holder 26 carrying an electrode assembly 28, assembly 28 best shown in FIG. 2. Assembly 28 includes a coupler shank 30 with an end 32 defining a part-spherical socket 34 receiving a ball electrode 35, which acts as an upper electrode. A retainer ring 36 is attached to the end 32 to retain the ball electrode 35 within the socket 34. The retainer ring 36 may be formed of any suitable material, for example it could be formed of graphite to provide heat resistant lubrication for the ball electrode 35 within the socket 34.

When the ball electrode 35 is retained in the socket 34, the ball should be able to roll in any direction within the socket to allow the positioner 20 to move the upper electrode in any direction along the surface of the structural assembly 15. A coolant passage 37 for circulating liquid coolant extends through the jointed arm 24 and into the coupler shank 30 to allow welding heat to be transferred from the upper electrode to the liquid coolant.

The resistance seam welding apparatus 11 also includes a second programmable positioner 39 located beneath the support 18. The positioner 39 includes a base 40 that is linearly movable along rails 41 extending about the length of the support 18. A plurality of control arms 42 carry a positionable holder 43 mounting a coupler shank 44 which may be similar to coupler shank 30. The positionable coupler shank 44 has an end 45 defining a part-spherical socket 46 adapted for receiving a ball electrode 47, which acts as a lower electrode. A retainer ring 48 attaches to the end 45 to retain the ball electrode 47 within the socket 46. The retainer ring 48 may be formed of graphite to provide lubrication for the ball electrode 47 within the socket 46. The ring 48 could be made of other suitable materials, and lubrication, if needed, could be provided by other means.

When the ball electrode 47 is retained in the socket 46, the ball should be able to roll in any direction within the socket to allow the positioner 39 to move the lower electrode in any direction along the surface of the structural assembly 15. A cooling passage 49 adapted for circulating liquid coolant extends through the holder 43 and into the coupler shank 44 to allow welding heat to be transferred from the lower electrode to the liquid coolant.

A transformer 50 provides welding current for the ball electrodes 35, 47.

Preferably the electrodes 35, 47 are spherical and universally rotatable within their respective sockets 34, 46 to create ball contact points for multidirectional seam welding. The ball electrodes should be of adequate size to move across the surfaces of the structural assembly while maintaining adequate contact with the structural assembly to form a continuous seam weld.

In operation, the spatial coordinates of the structural assembly 15 are programmed into the positioners 20, 39. A structural assembly 15 comprising workpieces 12, 14 in temporary assembly with opposing surfaces in contact along a seam line are placed onto the support 18 of the welding apparatus 11. The first and second positioners 20, 39 subsequently position the upper and lower ball electrodes 35, 47 at a first selected location 52 along the seam line so that the electrodes engage opposite sides 16, 17 of the structural assembly 15.

The transformer 50 then energizes the ball electrodes 35, 47 to cause welding current to travel between the electrodes through the first selected location 52 to form a weld 54 between the electrodes. As the weld 54 forms between the ball electrodes 35, 47, the positioners 20, 39 move the electrodes along the opposite surfaces of the structural assembly 15 to form a seam weld. As the positioners 20, 39 move the ball electrodes along the surfaces 16, 17, the electrodes 35, 47 roll within their respective sockets 34, 46 similar to a ball point pen to maintain contact with the surfaces 16, 17 of the workpieces 12, 14. During this time, the positioners 20, 39 adjust positioning of the ball electrodes 35, 47, as needed, to maintain optimal electrode contact with the workpieces 12, 14 for optimal weld quality.

The ball electrodes 35, 47 and their sockets should be made of suitable heat resistant high current (low resistance) materials, such as copper zirconium to maximize electric current through the workpieces and limit temperatures of the electrodes and excessive heat loss to the coolant in the coupler shanks 30, 44. Other suitable materials may also be used if desired.

During the welding process, coolant is circulated through the cooling passages 37, 49 to remove excess heat from the coupler shanks 30, 44 and the ball electrodes 35, 47.

The electrodes 35, 47, may be sequentially repositioned at subsequent selected locations 52 to allow the electrodes to form multiple seam welds 54 along multiple seam lines. Once all of the seam lines 52 are welded the structural assembly 15 is completed and removed from the support 18.

The ball shape of the electrodes 35, 47 improves the versatility of the seam welding apparatus 11 by allowing the positioners 20, 39 to move the electrodes over various contours on the surfaces of the workpieces to form non-planar or non-linear seam welds. In addition, the ball electrodes 35, 47 allow the positioners 20, 39 to move the electrodes in a 360 degree pattern along the surface of the structural assembly 15 to form continuous closed pattern seam welds.

When the retaining rings are formed of a lubricating material, such as graphite, the retaining rings 36, 48 provide lubrication for the ball electrodes 35, 47 within the sockets 34, 46 to allow the ball electrodes to roll freely over the surfaces 16, 17 of the workpieces 12, 14.

The ball shape of the electrodes 35, 47 provide small surface area contacting the surfaces 16, 17 of the structural assembly 15. As a result, the amount of current required to form a weld between the ball electrodes 35, 47 can be reduced, thereby increasing the efficiency of the welding apparatus 11.

Figure 3:
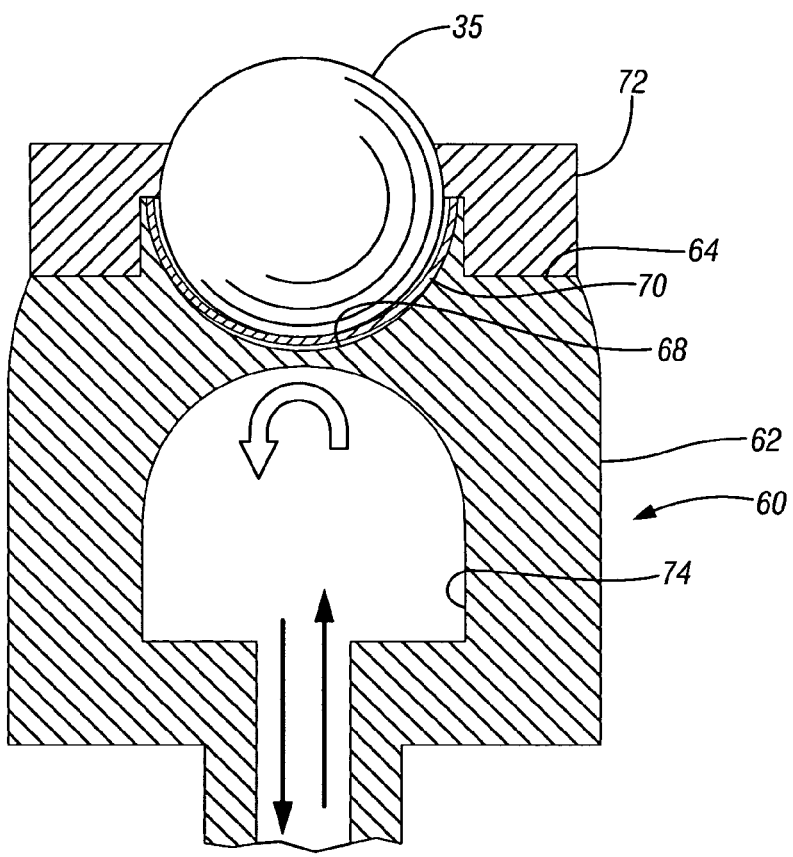
FIG. 3 is a schematic cross-sectional view through an alternative ball electrode assembly for the resistance seam welding apparatus of FIG. 1.

FIG. 3 shows an alternative electrode assembly 60 similar to electrode assembly 28 where like numbers indicate like parts. Assembly 60 includes a coupler shank 62 with an end 64 defining a part-spherical socket, not shown, adapted to retain a ball electrode 35. The socket is provided with a groove 68 adapted to retain a conductive leaf type spring 70 within the socket and engaging the ball electrode 35. The spring 70 is preferably formed of a carbon material that provides lubrication between the ball electrode and the coupler shank. A retainer ring 72 is attached to the end 64 to retain the ball electrode 35 and the spring 70 within the socket.

The spring 70 provides a large conductive contact with the ball electrode 35 to provide welding current to the ball electrode. The spring 70 also reduces friction by providing lubrication between the ball electrode 35 and the coupler shank 62. In addition, the spring 70 may movably suspend the ball electrode 35 within the socket of the coupler shank 62 to allow the ball electrode to move axially within the socket.

When the ball electrode 35 is retained in the socket, the ball electrode should be able to roll in any direction within the socket to allow a positioner to move the ball electrode in any direction along the surface of the structural assembly 15. A coolant passage 74 for circulating liquid coolant extends into the coupler shank 62 to allow welding heat to be transferred from the ball electrode 35 to the liquid coolant.

In operation, electrode assembly 60 operates similarly to electrode assembly 28 in that the ball electrode 35 rotates within the socket to allow a positioner to move the electrode assembly over the surfaces of a structural assembly 15.

It should be understood, that either one of the ball electrodes 35, 47 may be replaced with any suitable electrode that will conduct current from the remaining ball electrode through the assembly opposite the locations of the remaining ball electrode.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method for resistance seam welding workpieces, the method comprising:
    combining a pair of workpieces into a temporary assembly having at least selected portions in contact for resistance seam welding of the workpieces together;
    actuating a first programmable mechanism to rotatably move a first generally spherical ball electrode in a prescribed pattern against one side of the assembly;
    actuating a second programmable mechanism to simultaneously rotatably move a second generally spherical ball electrode in the same pattern against an opposite side of the assembly with the electrodes maintained at opposite positions of the assembly during their motion; and
    conducting electric welding current between the electrodes through the assembly to create a seam weld along the prescribed pattern.

2. A method as in claim 1 wherein the ball electrodes are moved in a non-linear pattern.

3. An apparatus for resistance seam welding workpieces, the apparatus comprising:
    a support for holding a pair of workpieces in a temporary assembly with opposing surfaces in contact along a seam line;
    a first ball electrode and a second electrode simultaneously engagable with opposite surfaces of the assembly along the seam line for locally conducting welding current through the workpieces to weld the workpieces together along the seam line, each ball electrode being rotatable in any direction against its respective workpiece surface for conducting welding current therethrough;
    a first programmable positioner carrying the first ball electrode and operative to rotatably move the first ball electrode along the seam line in engagement with one side of the assembly;
    the second electrode operatively engaging an opposite side of the assembly and operative to conduct current passed through the assembly opposite the locations of the first ball electrode; and
    an electric current producing device connected with the electrodes for welding the assembly together along the seam line.

4. An apparatus as in claim 3 wherein the second electrode is also a ball electrode rotatable in any direction against its respective workpiece surface for conducting welding current therethrough, the apparatus including a second programmable positioner carrying the second ball electrode and operative to rotatably move the second ball electrode along the seam line in engagement with said opposite side of the assembly.

5. An apparatus as in claim 4 wherein at least one of the positioners is a robotic arm.

6. An apparatus as in claim 4 wherein at least one of the, ball electrodes is rotatably supported by a holder carried by one of the positioners.

7. An apparatus as in claim 6 wherein the holder includes a coupler shank and a socket in which the ball electrode is rotatably received.

8. An apparatus as in claim 7 including a retainer ring attached to the holder and rotatably retaining the ball electrode in the socket.

9. An apparatus as in claim 7 wherein the bail electrode is lubricated by a high temperature lubricant in the socket.

10. An apparatus as in claim 9 wherein the high temperature lubricant is a ring engagable by the ball electrode.

11. An apparatus as in claim 7 including a leaf type spring extending within a groove within the socket providing a partially suspended electrical contact for the ball electrode.

12. An electrode assembly for use in resistance seam welding of electrically conductive metal workpieces together, the assembly comprising:
    a ball electrode formed of low resistance electrically conductive heat resistant material of generally spherical configuration; and
    a coupler shank mountable to a welding tool holder and including an end defining a part-spherical socket receiving the ball electrode and a retainer secured to the shank and retaining the ball electrode for free omnidirectional rotation in the socket, the ball electrode protruding beyond the retainer for rotatable engagement with a workpiece;
    the socket being connectable with a source of welding current and formed of material capable of conducting resistance welding current to the ball electrode.

13. An assembly as in claim 12 wherein the retainer is a ring.

14. An assembly as in claim 13 wherein the ring includes a graphitic lubricant material.

15. An assembly as in claim 12 wherein the shank includes an internal passage for circulating liquid coolant for cooling the assembly.

16. An assembly as in claim 12 wherein the socket includes a groove receiving a conductive leaf spring retained in the socket and suspending the ball electrode in the socket to allow slight axial motion of the ball electrode within the socket.

* * * * *